United States Patent

Chana

[11] 3,977,502
[45] Aug. 31, 1976

[54] HYDRODYNAMIC DRIVE AND SLIPPING CLUTCH

[75] Inventor: Howard E. Chana, Troy, Mich.

[73] Assignee: General Motors Corporation, Detroit, Mich.

[22] Filed: May 21, 1975

[21] Appl. No.: 579,617

[52] U.S. Cl. .............................. 192/3.3; 192/3.31; 74/733; 192/103 FA; 137/47; 60/359
[51] Int. Cl.² ........................................ F16D 47/06
[58] Field of Search ................... 192/3.29, 3.3, 3.31; 74/733

[56] References Cited
UNITED STATES PATENTS

| | | | |
|---|---|---|---|
| 2,699,074 | 1/1955 | Livezey | 192/3.3 X |
| 3,213,983 | 10/1965 | Smirl et al. | 192/3.3 X |
| 3,730,315 | 1/1973 | Annis et al. | 192/3.3 X |

*Primary Examiner*—Benjamin W. Wyche
*Attorney, Agent, or Firm*—D. F. Scherer

[57] ABSTRACT

A hydrodynamic drive and slipping clutch arranged in parallel drive relation to provide a controlled slip input drive to a mechanical gear arrangement. The slip speed of the clutch, and therefore the hydrodynamic drive, is controlled by clutch engagement responsive to differential pressure on the clutch. The differential pressure is maintained by controlling fluid flow through a restriction which has a variable opening responsive to a control element which is movable in response to pressure generated by the speed difference between the hydrodynamic drive input and output to establish clutch engagement of sufficient force to maintain a predetermined slip speed in the hydrodynamic drive.

3 Claims, 2 Drawing Figures

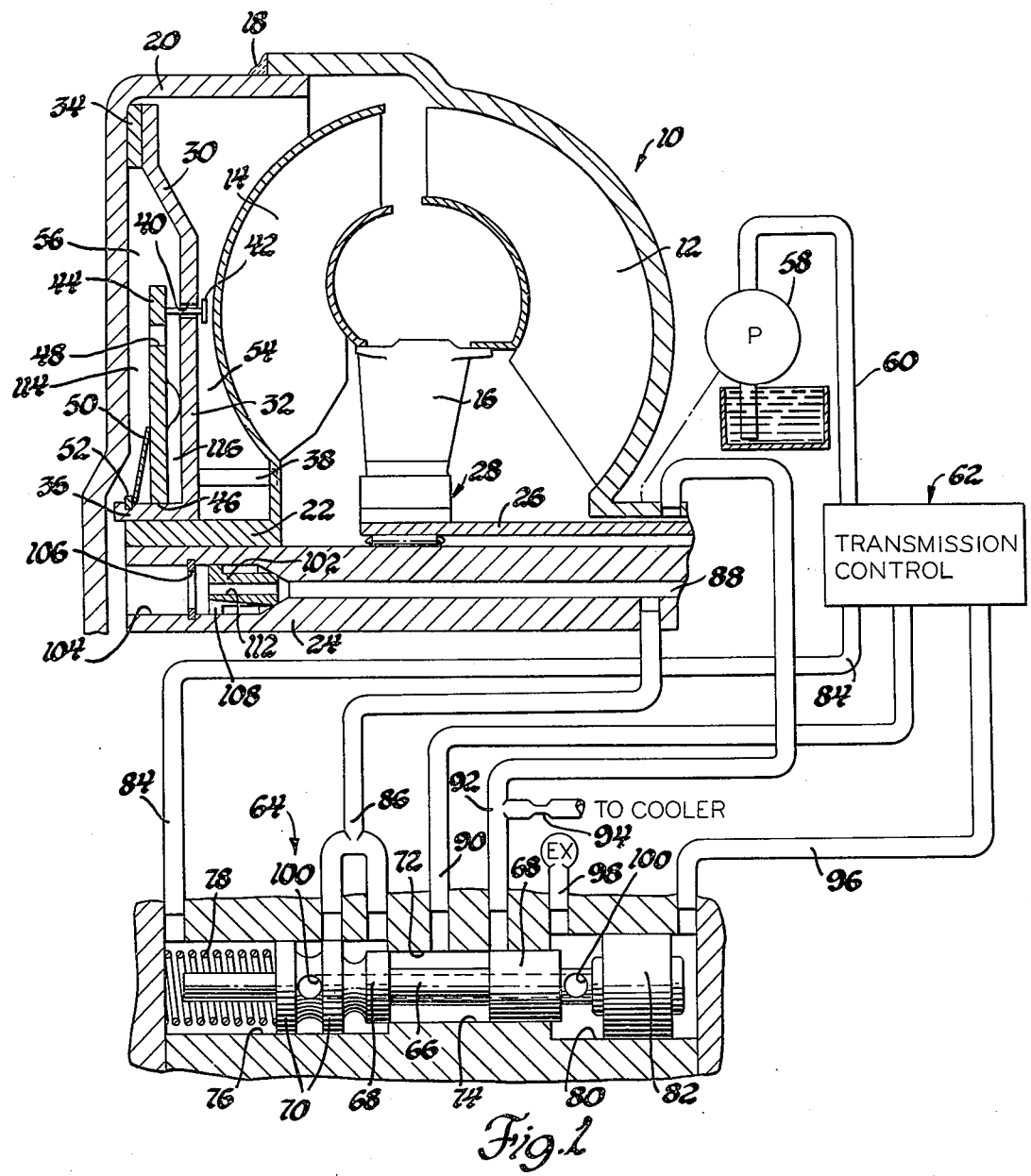
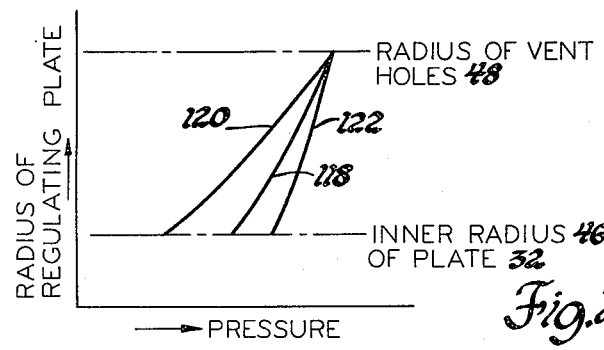
Fig. 2

HYDRODYNAMIC DRIVE AND SLIPPING CLUTCH

The present invention is related to hydrodynamic drives and more particularly to hydrodynamic drives having a slipping clutch arranged in parallel independent drive relation thereto.

Prior art arrangements incorporating hydrodynamic drives and a slipping clutch, such as Annis et al U.S. Pat. No. 3,730,315, have an engagement control for the clutch which depends on the hydrodynamic turbine thrust to establish clutch engagement pressure. While turbine thrust provides a satisfactory control, there is a small measure of variance associated therewith which is dependent on the design of the hydrodynamic device and production variance.

The present invention seeks a more predictable clutch control by establishing the clutch engagement pressure in proportion to the speed differential between the input member of impeller and the output member or turbine of the hydrodynamic. The speed differential establishes a pressure differential on a control plate, which plate responds to the pressure, by moving axially, to control fluid flow through a restriction thereby establishing a pressure differential on the clutch. Since the clutch engagement force is determined by this pressure differential, the slipping engagement of the clutch can be maintained at the desired speed differential between the impeller and turbine.

It is therefore a general object of this invention to provide in a hydrodynamic drive and slipping clutch an improved clutch engagement control element which is responsive to the speed differential between the input and output members of the hydrodynamic drive to control the pressure differential on the clutch.

Another object of this invention is to provide in a hydrodynamic drive and slipping clutch an improved engagement control for said clutch wherein a variable flow restriction is controlled by a rotating plate which moves axially in response to pressure gradients imposed thereon resulting from a speed differential between the input and output members of the hydrodynamic drive, said flow restriction is operable to establish a controlled net engagement pressure for said clutch whereby a predetermined slip speed is maintained in the hydrodynamic drive.

These and other objects and advantages of the present invention will be more apparent from the following description and drawings in which:

FIG. 1 is a diagrammatic representation partially in cross-section of a hydrodynamic drive, clutch, and control; and FIG. 2 is a graph depicting thte control pressure gradients existing in portions of FIG. 1.

Referring to the drawing there is shown in FIG. 1 a conventional torque converter 10 having an impeller member 12, a turbine member 14 and a stator 16. The impeller, turbine, and stator are connected in torroidal flow in a conventional manner to provide a hydrodynamic drive from the engine, not shown to the planetary gearing, not show, which may be connected into the torque converter. The impeller 12 is welded or otherwise secured at 18 to an input shell 20 which is adapted to be connected to the engine. The turbine 14 has a hub portion 22 drivingly connected to a turbine output shaft 24, which is adapted to be connected to a conventional planetary gearing arrangement. The stator 16 is connected to a stator shaft 26 through a conventional one-way device 28. The stator shaft 26 is maintained stationary in the usual manner and the one-way device 28 prevents rotation of the stator in one direction during the torque conversion stage of the torque converter 10 and permits rotation in the other direction during the fluid coupling phase of the torque converter 10.

A clutch 30, having a clutch plate 32 and a friction surface 34, is axially slidably disposed on the turbine hub 22 by an annular portion 36 of plate 32, and is rotatably drivingly connected to the turbine 14 through a plurality of tang drives 38. The friction surface 34 is adapted to frictionally engage the input shell 20 under a controlled slipping condition, as will be described later, to provide a mechanical drive between the input shell 20 and the turbine shaft 24. A fluid restriction 40 is formed in the clutch plate 32 and also disposed through the clutch plate 32 is a restriction control member 42 which is secured to a control plate 44. The plate 44 is sealingly and slidingly disposed on the portion 36 at the inner radius 46. The plate 44 has a plurality of pressure balance holes 48 formed therein at a radius disposed outwardly from the inner radius 46. The plate 44 is urged toward the clutch plate 32 by a flat spring 50 which abuts the plate 44 and a lock ring 52 positioned on the portion 36. When the spring 50 moves the plate 44 to the position shown the restricted opening 40 is at its maximum opening. The clutch plate 32 divides the space between the turbine 14 and the input shell 20 into an engagement chamber 54 and a disengagement chamber 56.

The impeller 12 drives a conventional fluid pump 58 which draws fluid from a sump and delivers the fluid, via passage 60, to a conventional transmission control 62. The transmission control 62 may be constructed in accordance with the control disclosed in U.S. Pat. No. 3,321,056 issued to Winchell et al. Fluid pressure from the control 62 is directed to a clutch control valve 64 which may be incorporated within the transmission control paper.

The clutch control valve 64 includes a stepped valve spool 66 having spaced equal diameter small lands 68 and spaced equal diameter large lands 70. These valve lands are slidably disposed in a stepped valve bore 72 which has a small diameter bore 74 and a larger diameter bore 76. A compression spring 78 is compressed between one end of valve spool 66 and one end of valve bore 76. The valve bore 72 also has a larger diameter portion 80 in which is slidably disposed a control member 82 which is adapted to abut one end of valve spool 66. The valve bore 76 is connected to a passage 84 which is in fluid communication with the transmission control 62. The portion 76 is also in communication with a passage 86 at two points as shown which passage 86 is in communication with a central passage 88 formed in the turbine shaft 24. The small diameter portion 74 is in fluid communication with a passage 90 which is in fluid communication with the transmission control 62 and to a passage 92 which is in fluid communication with the torque converter 10. The passage 92 is also connected through a restriction 94 to a conventional cooler which provides cooling of oil within the system. The restriction 94 is imposed to limit the oil flow to the cooler and to aid in maintaining the required pressure in passage 92. The diameter portion 80 is in fluid communication with a passage 96 which is also in fluid communication with transmission control 62 and with an exhaust passage 98. The exhaust passage 98 and passage 96 are maintained out of fluid communication by the control member 82. The exhaust passage 98 is in fluid communication with a passage 100 which extends centrally through a portion of valve spool 66 and is open for communication to the space between lands 70 of the valve spool 66.

During operation of the transmission, the passage 96 is always in fluid communication with line pressure generated within the transmission control 62. The passage 90 is always in fluid communication with the converter charge pressure which is generated within the transmission control 62. These two pressure levels are generated in a well known manner by a regulator valve, not shown. The passage 84 is connected into the transmission control 62 in a manner such that when the second gear reaction device or clutch is engaged the passage is pressurized. This means that there is no pressure in passage 84 during first gear operation of the transmission and accordingly the only rightward bias in valve spool 66 is that of compression spring 78. Thus, when the transmission is conditioned for first gear drive, line pressure in passage 96 will urge control member 82 and valve spool 66 to the left against spring 78 to establish fluid communication between converter charge pressure passage 90 and passage 86 and the fluid from the converter 10, exhausting via passage 92, will pass through restriction 94 to the transmission cooler. When the transmission upshifts from first gear to second gear fluid pressure will enter passage 84 and will act on the end of valve land 70. The differential area between valve land 70 and valve land 68 and the area of control member 82 are designed such that at a predetermined fluid pressure level in passages 96 and 84 the valve spool will be shifted to the right. Since the line pressure in conventional transmission controls is a variable fluid pressure which varies in accordance with throttle setting, the valve 64 can be designed such that below a predetermined throttle setting the pressure in passage 84 and spring 78 will not be sufficient to overcome the bias established by the pressure in passage 96 and the pressure in the differential area between lands 70 and 68. However, when a lower threshold pressure is reached, the valve spool 66 will be moved to the right. The areas of 82 and valve land 70 and the force in spring 78 are also designed in such a manner that at high throttle settings the pressure acting on control member 82 will be sufficient to overcome the forces on valve land 70 occasioned by the spring 78 and fluid pressure in passage 84 such that the valve 66 will move back to the left position. Thus the valve 64 is controlled to be shiftable withtin a range of throttle settings.

When the valve spool 66 is moved to the right as explained above, the converter charge pressure in passage 90 will be open between land 68 to the passage 92. The fluid in passage 86 will be open to exhaust 98 through the passage 100 formed between lands 70 and through the valve spool 66.

When the valve spool 66 is positioned in the leftward position, fluid pressure in passage 86 passes through passage 88 to turbine shaft 24 and through a check valve 102. The check valve is slidably disposed in bore 104 formed in the turbine shaft 24 and is retained therein by a stop member 106. A plurality of openings 108 are formed on the check valve 102. When the check valve 102 is urged against the stop member 106 by fluid pressure in passage 88 free flow through openings 108 is permitted. This fluid flows into the disengagement chamber 56, past the face of clutch facing 34, and into the torque converter 10 between the impeller 12 and turbine 14 to supply the fluid necessary for operation of the torque converter. The fluid in the torque converter is exhausted through passage 92 and restriction 94 to the cooler.

When the valve spool 66 is moved to the rightward position, fluid pressure from converter charge passage 90 is directed to passage 92 and therefrom into the torque converter 10 between the impeller 12 and stator 16. This fluid is circulated within the torque converter to provide the hydrodynamic drive effect. Some of the fluid passes out of the converter 10 into the engagement chamber 54. From the engagement chamber 54 it passes through restriction 40 into the disengagement chamber 56. From the disengagement chamber 56 the fluid passes through a fixed restriction 112 formed in the center of check valve 102. The fluid then passes through passage 88 to passage 86 from which it is exhausted through the valve spool 66 via passage 100. When the valve spool 66 is in the leftward position the clutch 30 is maintained in the disengaged position. When the valve spool 66 is moved to its rightward position the clutch 30 is maintained in a controlled engaged position. The clutch 30 is maintained in slipping engagement which is dependent on the differential between the input and output speed of the torque converter as determined by the speeds of impeller 12 and turbine 14, respectively.

The control plate 44 cooperates with the clutch plate 30 and input shell 20 to form a drive chamber 114 and a driven chamber 116. Since the control plate 44 rotates at the speed of the turbine 14 and the input shell 20 rotates at input speed which is equal to the speed of impeller 12, the fluid pressure generated by this rotating action in the drive chamber 114 is proportional to the average speed between the input and output. Since the presure balance openings 48 communicate with both the drive chamber 114 and the driven chamber 116 the pressure at radius on plate 44 must be equal in both chamber. The fluid in the driven chamber 116 is acted on by the speed of the output or turbine member only. Since the pressure in chambers 114 and 116 must be equal at the balance holes 48, the pressure gradient formed in chamber 116 will have substantially higher pressure at its inner radius than the pressure available at the inner radius of chamber 114 when the turbine speed is less than impeller speed. This is due to the fact that the chamber 116 has fluid pumped into it because of the lower centrifugal force generated within the chamber 116. The fluid is pumped from chamber 114 to chamber 116 until the required pressure gradient is reached. When the input and output members are rotating at equal speed of course the pressure gradients on both sides of plate 44 will be equal. If the turbine member 14 is rotating more rapidly than the input member 20 the pressure gradient in chamber 116 will be less than the pressure gradient in chamber 114. This is shown in FIG. 2 on the graph depicted there. The line 118 represents the pressure gradient formed in chamber 116. The line 120 represents the pressure gradient formed in chamber 114 when the input member 20 is rotating at a speed faster than the output member 24. The line 112 represents the pressure gradient in chamber 114 when the output member 24, and therefore turbine 14, is rotating more rapidly than the input member 20. When the input and output members are rotating at the same speed the pressure gradient in both chambers will be equal to the pressure gradient shown by line 118. These lines are depicted for a fixed turbine speed and input speeds that vary therefrom. Therefore there is a family of curves which are represented by various turbine speeds. As can be seen on the graph the pressure gradients have a point of equality at the radius of vent holes 48 and have pressure variances at the inner radius 46 of plate 32 except when the turbine and impeller are rotating at equal speeds.

Assuming the input member 20 is rotating more rapidly than the output member 24, when the pressure gradient in chamber 116 is sufficient to overcome the force in spring 50 and the pressure gradient in chamber 114 the plate 44 will move axially to the left to decrease the area of restriction 40. Thus less fluid will flow from chamber 54 to chamber 56 and, since chamber 56 has a fixed restiction outlet, the pressure in chamber 56 will decrease. As the pressure in chamber 56 decreases the differential pressure chambers 54 and 56 operate on plate 32 to begin engagement of clutch 30 with the input member 20. As the clutch 30 engages and begins transmitting torque from the input member 20, the required torque transmitted by the hydrodynamic device is reduced and the input to output speed difference will decrease. At a predetermined speed differential between input and output members the pressure gradient in chamber 114 plus the force in spring 50 will balance the pressure gradient in chamber 116 such that the plate 44 will move to provide controlled flow and therefore controlled pressure differentials between chambers 54 and 56 to maintain the clutch at the required slip speed.

If the speed of input member 20 should decrease because of the change in throttle setting or change in road load condition, the clutch engagement force must be readjusted to provide the desired slip speed for this condition. To accomplish this the control plate 44 will move axially to the right to open the restriction 40, thus permitting a higher pressure in the disengagement chamber 56 such that the clutch 30 will undergo a change in engagement force which results in a change in the torque split between the hydrodynamic device and the clutch, thereby maintaining the required slip differential. If the speed of input member 20 should increase, the pressure gradient in chambers 114 and 116 would vary such that the control plate 44 would be moved to the left to further close the restriction 40 to decrease the pressure in chamber 56 which results in an increase in clutch engagement force, a decrease in the hydrodynamic torque that must be transmitted, a decrease in slip speed results until the desired slip differential is reached. During coasting of the vehicle, the turbine 14 is accelerated to a speed equal to or greater than the impeller 12. At this time the control plate 44 would be moved to the right to fully open the restriction 40 and provide for substantial balancing of the engagement and disengagement pressures in chambers 54 and 56, respectively, which would substantially eliminate clutch engagement during coasting.

The above described embodiment is illustrative of the invention which may be modified within the scope of the appended claims.

I claim:
1. An automotive transmission comprising:
an input drive member;
an output driven member;
a torque converter including an impeller secured to said input drive member, and a turbine drivingly connected to said output driven member;
a fluid operated friction clutch drivingly connected for unitary rotation with said turbine and frictionally engaging said input drive member including an engagement chamber disposed between the clutch and the turbine, a disengagement chamber disposed between the clutch and the input driven member, and a variable area opening fluid flow restriction disposed on said clutch communicating between said engagement chamber and said disengagement chamber to control fluid flow and the resultant differential pressure between said chambers so that the clutch is controlled by an axial force to slippingly engage the input drive member;
a control plate connected to said variable restriction and being disposed on said friction clutch in said disengagement chamber for unitary rotation with said clutch and said turbine and being axially movable to control the area opening of said variable restriction;
a first control chamber formed between said control plate and said input drive member being filled with fluid so that a pressure gradient proportional to the average speed of the input member and the output member is generated;
a plurality of pressure balance openings formed in said control plate communicating with said first control chamber;
a spring member disposed in said first control chamber abutting said control plate and urging same toward said clutch; and
a second control chamber formed between said control plate and said clutch and being in communication with said pressure balance openings and being filled with fluid so that a pressure gradient is generated therein sufficient to provide equal pressure in both said control chambers at said pressure balance openings, whereby when the speed of said input drive member is at or above a predetermined value greater than the speed of said output driven member said control plate will be moved axially to reduce the area of said variable restriction thereby increasing the engagement force of said clutch to maintain a predetermined speed differential between the impeller and turbine of said torque converter.

2. A drive mechanism comprising:
a drive member;
a driven member;
means defining a hydrodynamic drive connection between said members;
means defining a friction coupling drive between said members independent to and in parallel drive relation with said hydrodynamic drive and being selectively engageable by a controlled axial fluid force;
means defining a rotatable element connected for unitary rotation with said driven member and cooperating with said friction coupling and said drive member to form a driven speed chamber and a drive speed chamber respectively wherein respective fluid pressure gradients are developed, the pressure gradient in said drive speed chamber being proportional to the average speed of the drive and driven members, the pressure gradient in said driven speed chamber being greater than the pressure gradient in said speed chamber when the speed of the driven member is a predetermined value lower than said drive member so that said rotatable element will move axially in response to the pressure gradients; and means defining a variable restriction on said second named means and being connected to said third named means to respond to the axial movement of said rotatable element to control the axial fluid force on said friction coupling to maintain said friction coupling engaged with sufficient force to establish a predetermined speed differential between said drive membe and said driven member.

3. An automotive transmission comprising:

an input drive member;

an output driven member;

a torque converter including an impeller secured to said input drive member, and a turbine drivingly connected to said output driven member;

a fluid operated friction clutch drivingly connected for unitary rotation with said turbine and frictionally engaging said input drive member including an engagement chamber disposed between the clutch and the turbine, a disengagement chamber disposed between the clutch and the input driven member, and a variable area opening fluid flow restriction disposed on said clutch communicating between said engagement chamber and said disengagement chamber to control fluid flow and the resultant differential pressure between said chambers so that the clutch is controlled by an axial force to slippingly engage the input drive member;

means defining a rotatable element connected for unitary rotation with said output driven member and cooperating with said friction clutch and said input drive member to form a driven speed chamber and a drive speed chamber respectively wherein respective fluid pressure gradients are developed, the pressure gradient in said drive speed chamber being proportional to the average speed of the drive and driven members, the pressure gradient in said driven speed chamber being greater than the pressure gradient in said drive speed chamber when the speed of the driven member is a predetermined value lower than said drive member so that said rotatable element will move axially in response to the presssure gradients to control the opening of said fluid flow restriction to maintain said friction clutch engaged with sufficient force to establish a predetermined speed differential between said input drive member and said input driven member.

* * * * *